United States Patent
Kreimer et al.

(10) Patent No.: US 12,407,490 B2
(45) Date of Patent: Sep. 2, 2025

(54) REDUNDANCY AES MASKING BASIS FOR ATTACK MITIGATION USING LOOKUP TABLES

(71) Applicant: FortifyIQ, Inc., Newton, MA (US)

(72) Inventors: Ury Kreimer, Tekoa (IL); Yaacov Belenky, Maale Adumim (IL); Alexander Kesler, Newton, MA (US)

(73) Assignee: FortifyIQ, Inc., Newton, MA (US)

( * ) Notice: Subject to any disclaimer, the term of this patent is extended or adjusted under 35 U.S.C. 154(b) by 184 days.

(21) Appl. No.: 18/461,206

(22) Filed: Sep. 5, 2023

(65) Prior Publication Data

US 2024/0089086 A1  Mar. 14, 2024

Related U.S. Application Data

(60) Provisional application No. 63/374,694, filed on Sep. 6, 2022.

(51) Int. Cl.
| | | |
|---|---|---|
| *G06F 21/00* | (2013.01) | |
| *G06F 17/16* | (2006.01) | |
| *H04L 9/00* | (2022.01) | |
| *H04L 9/06* | (2006.01) | |

(52) U.S. Cl.
CPC ............ *H04L 9/0631* (2013.01); *G06F 17/16* (2013.01); *H04L 9/002* (2013.01)

(58) Field of Classification Search
None
See application file for complete search history.

(56) References Cited

U.S. PATENT DOCUMENTS

| | | | |
|---|---|---|---|
| 11,418,317 B2 | 8/2022 | Kreimer et al. | |
| 2002/0191784 A1* | 12/2002 | Yup .................. | H04L 9/0631 380/37 |
| 2006/0140401 A1* | 6/2006 | Johnson ............ | G06F 21/14 380/44 |
| 2008/0044012 A1* | 2/2008 | Ekberg .............. | H04W 12/033 380/30 |

(Continued)

OTHER PUBLICATIONS

Medwed, Marcel; Schmidt, Jorn-Marc. A Continuous Fault Countermeasure for AES Providing a Constant Error Detection Rate. 2010 Workshop on Fault Diagnosis and Tolerance in Cryptography. https://ieeexplore.ieee.org/stamp/stamp.jsp?tp=&arnumber=5577364 (Year: 2010).*

(Continued)

*Primary Examiner* — Jeremiah L Avery
(74) *Attorney, Agent, or Firm* — Brake Hughes Bellermann LLP

(57) ABSTRACT

Techniques include replacing many of the functions used in finite-field-based arithmetic with lookup tables (LUTs) and combining such LUTs with redundancy-based protection. Advantageously, using LUTs makes it possible to dramatically decrease the redundancy level (e.g., from d=8 to d=3 or 4) and the power consumption and increase the maximal frequency, while preserving the same protection level, latency and performance. The improvement is applicable not only to AES, but also to other algorithms based on a finite field arithmetic, and in particular SM4, ARIA, and Camellia which use Sboxes very similar to or the same as the AES Sbox.

42 Claims, 4 Drawing Sheets

(56) References Cited

U.S. PATENT DOCUMENTS

| | | | | |
|---|---|---|---|---|
| 2014/0169553 | A1* | 6/2014 | Chen | G06F 7/726 |
| | | | | 380/28 |
| 2015/0067302 | A1* | 3/2015 | Gueron | G06F 9/3887 |
| | | | | 712/210 |
| 2020/0177365 | A1* | 6/2020 | De Hoogh | G06F 17/141 |
| 2022/0278822 | A1* | 9/2022 | Ekdahl | H04L 9/0631 |
| 2023/0027694 | A1* | 1/2023 | Voloshinov | H04L 9/0852 |

OTHER PUBLICATIONS

Vasudevan, Varun et al. Design and Complexity Analysis of Reed Solomon Code Algorithm for Advanced RAID System in Quaternary Domain. 2011 IEEE Computer Society Annual Symposium on VLSI. https://ieeexplore.ieee.org/stamp/stamp.jsp?tp=&arnumber=5992524 (Year: 2011).*

Kermani, Mehran Mozaffari et al. Reliable Inversion in GF($2^8$) With Redundant Arithmetic for Secure Error Detection of Cryptographic Architecture. IEEE Transactions on Computer-Aided Design of Integrated Circuits and Systems, vol. 37, Issue: 3. (URL https://ieeexplore.ieee.org/stamp/stamp.jsp?tp=&arnumber=7954043) (Year: 2018).*

"Announcing the Advanced Encryption Standard (AES)", Federal Information Processing Standards Publication 197, Nov. 26, 2001, 51 pages.

Belenky, Yaacov, et al., "Redundancy AES Masking Basis for Attack Mitigation (RAMBAM)", IACR Transactions on Cryptographic Hardware and Embedded Systems; vol. 2022, No. 2, DOI: 10.46586/tches./v2022.12.69-91, Feb. 15, 2022, pp. 69-91.

Osvik, Dag Arne, et al., "Cache Attacks and Countermeasures: The Case of AES", Topics in Cryptology—CT-RSA 2006: The Cryptographers' Track at the RSA Conference 2006, San Jose, CA, USA, Feb. 13-17, 2005. Proceedings. Springer Berlin Heidelberg, 2006, pp. 1-25.

* cited by examiner

REDUNDANCY AES MASKING BASIS FOR ATTACK MITIGATION USING LOOKUP TABLES

CROSS REFERENCE TO RELATED APPLICATION

This application claims the benefit of U.S. Provisional Application No. 63/374,694, filed Sep. 6, 2022, the disclosure of which is incorporated herein by reference in its entirety.

TECHNICAL FIELD

This description relates in general to side-channel attack mitigation.

BACKGROUND

From a cybersecurity perspective, a side-channel attack is any attack based on extra information that can be gathered because of the fundamental way a computer protocol or algorithm is implemented, rather than flaws in the design of the protocol or algorithm itself. Timing information, power consumption, electromagnetic leaks, and sound are examples of extra information which could be exploited to facilitate side-channel attacks.

SUMMARY

In one general aspect, a method includes receiving input data representing a plaintext and a key. The method also includes representing each byte B of the input data as a respective redundant byte, the respective redundant byte B' having 8+d bits, where the respective redundant byte is a polynomial over GF(2) modulo a product PQ such that B=B' modulo P, where P is a polynomial of degree eight and Q is a polynomial of degree d≥0. The method further includes performing: an AddRoundKey operation and a ShiftRows operation to produce a respective first redundant state; and a composite redundant SubBytes and redundant MixColumns operation on the respective first redundant state using a lookup table (LUT) to produce a respective second redundant state. The method further includes repeating the performing a specified number of times to produce ciphertext data representing a ciphertext of the plaintext.

In another general aspect, a method includes receiving input data representing a plaintext and a key. The method also includes representing each byte B of the input data as a respective redundant byte B' such that B=H(B'), the respective redundant byte having 8+d bits, d≥0, where the respective redundant byte is an element of a vector space U of dimension 8+d and H is a homomorphism H: U↦V, where V is a vector space of dimension 8 in which each element is a byte such that one of redundant representations of the byte is a same value extended by d most significant zeroes. The method further includes performing: an AddRoundKey operation and a ShiftRows operation to produce a respective first redundant state; and a composite redundant SubBytes and redundant MixColumns operation on the respective first redundant state using a lookup table (LUT) to produce a respective second redundant state. The method further includes repeating the performing a specified number of times to produce ciphertext data representing a ciphertext of the plaintext.

In another general aspect, a computer program product comprising a non-transitory storage medium, the computer program product including code that, when executed by at least one processor, causes the at least one processor to perform a method. The method includes receiving input data representing a plaintext and a key. The method also includes representing each byte B of the input data as a respective redundant byte B', the respective redundant byte having 8+d bits, where the respective redundant byte is a polynomial over GF(2) modulo a product PQ such that B=B' modulo P, where P is a polynomial of degree eight and Q is a polynomial of degree d≥0. The method further includes performing: an AddRoundKey operation and a ShiftRows operation to produce a respective first redundant state; and a composite redundant SubBytes and redundant MixColumns operation on the respective first redundant state using a lookup table (LUT) to produce a respective second redundant state. The method further includes repeating the performing a specified number of times to produce ciphertext data representing a ciphertext of the plaintext.

In another general aspect, an apparatus includes memory and processing circuitry coupled to the memory. The processing circuitry is configured to receive input data representing a plaintext and a key. The processing circuitry is also configured to represent each byte B of the input data as a respective redundant byte B, the respective redundant byte having 8+d bits, where the respective redundant byte is a polynomial over GF(2) modulo a product PQ such that B=B' modulo P, where P is a polynomial of degree eight and Q is a polynomial of degree d≥0. The processing circuitry is further configured to perform: an AddRoundKey operation and a ShiftRows operation to produce a respective first redundant state; and a composite redundant SubBytes and redundant MixColumns operation on the respective redundant state using a lookup table (LUT) to produce a respective second redundant state. The processing circuitry is further configured to repeat the performing a specified number of times to produce ciphertext data representing a ciphertext of the plaintext.

The details of one or more implementations are set forth in the accompanying drawings and the description below. Other features will be apparent from the description and drawings, and from the claims.

DETAILED DESCRIPTION

Figure 1:
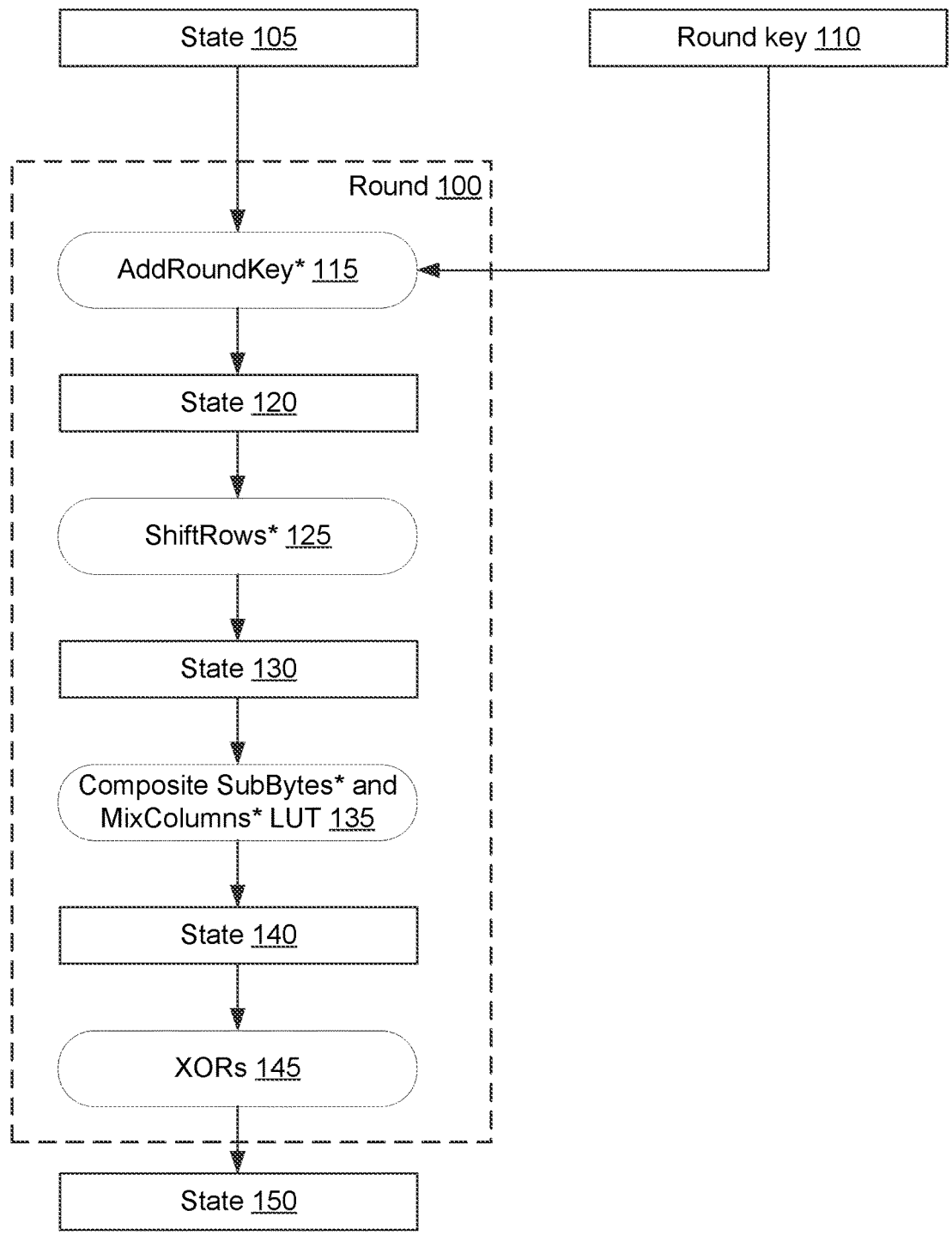
FIG. 1 is a diagram that illustrates an example round of encryption using lookup tables (LUTs) in a redundant basis.

In the definition of Advanced Encryption Standard (AES), the bytes of the input, of the output, of the key, and of the intermediate state are seen as elements of the finite field GF(256), represented as polynomials over GF(2) modulo a fixed irreducible polynomial $P_0 = x^8 + x^4 + x^3 + x + 1$ over GF(2) (i.e., as representatives of $GF(2)[x]/(P_0)$) with degrees less than 8), where the eight bits of the byte are the eight coefficients of the corresponding polynomial. If one regards this finite field as a vector space of dimension 8 over GF(2), one can equivalently say that the field elements are represented as vectors in this vector space with the basis $\langle 1, t_0, t_0^2, \ldots, t_0^7 \rangle$, where $t_0$ is a root of the polynomial $P_0$. The transformations used for AES encryption/decryption are defined in terms of the following:

Addition of such polynomials (XOR),

Their multiplication modulo $P_0$,

An affine transformation which is a part of the transformation SubBytes.

The suggested scheme ("RAMBAM") can be instantiated in multiple variants, where each variant is determined by the following:

An irreducible polynomial P of degree 8 not necessarily equal to $P_0$,

An element t of the field GF(256) which is a root of P,

A polynomial Q,

The degree d of the polynomial Q, called the redundancy. According to the scheme, the following transformation is applied to all the bytes of the input and/or of the key prior to the AES encryption/decryption:

A linear transformation $L_P$ into the representation of the elements of GF(256) in the basis $\langle 1, t, t^2, \ldots, t^7 \rangle$ (if $P=P_0$ and $t=t_0$, then this transformation is the identity transformation), Addition (XOR) of a polynomial RP, where R is a randomly chosen polynomial of a degree less than d (we will call it the initial randomization). XOR is denoted as $\oplus$.

Each byte has $2^d$ representations as an (8+d)-bit redundant byte. These redundant bytes are seen as polynomials over GF(2) modulo the product PQ (or, equivalently, representatives of the finite ring GF(2)[x]/(PQ) with degrees less than 8+d (the redundant domain)), and their multiplications are performed in the sense of this ring. For any redundant byte X, the byte represented by it can be calculated as $H(X)=L_P^{-1}(X \bmod P)$.

For every transformation used in AES encryption/decryption, its implementation in the redundant domain is denoted by adding an asterisk to its name. That is, redundant AddRoundKey is denoted AddRoundKey*, etc.

The transformations AddRoundKey* and MixColumns*/InvMixColumns* are performed similarly to how AddRoundKey and MixColumns/InvMixColumns are performed, but in the redundant domain. The constant coefficients 0x2 and 0x3 in MixColumns and 0x9, 0xb, 0xd, 0xe in InvMixColumns are replaced by $L_P(0x2)$, $L_P(0x3)$, $L_P(0x9)$, $L_P(0xb)$, $L_P(0xd)$, $L_P(0xe)$ respectively in MixColumns*/InvMixColumns*.

The standard transformation SubBytes is defined as Aff∘Inv, where Inv is the inversion in GF(256), where Inv(0) is defined to be 0, and Aff is a specific affine transformation. Note that since the order of the multiplicative group of the finite field GF(256) is $2^8-1=255$, Inv(x) can be alternatively defined as $Inv(X)=X^{254}$; this definition is correct for X=0 as well.

Inv*(X) is calculated as $X^{254}$ in the redundant domain, and instead of Aff another affine transformation Aff* is used, such that $\forall X(H(Aff^*(X))=Aff(H(X)))$ (there are many affine transformations for which this condition holds; any one of them can be used as Aff*). The standard InvSubBytes is defined as Inv∘Aff$^{-1}$. InvSubBytes* is handled similarly, using Aff*$^{-1}$ instead of Aff$^{-1}$.

After all the rounds of the AES encryption/decryption are performed, function H is applied to all the redundant bytes of the state to produce the (non-redundant) output in the standard representation (the de-randomization).

While the above scheme works to provide a protection level, a technical problem with the scheme is that the functions used such as SubBytes*, InvSubBytes*, Mul$_n$* (X), where n∈{0x2,0x3}, etc., can take too much power to provide the protection level. Moreover, the value of the redundancy d may be as much as 8 or more; this can lead to the excessive power used by the scheme.

A technical solution to the technical problem includes replacing many of the functions used in finite-field-based arithmetic with lookup tables (LUTs) and combining such LUTs with redundancy-based protection. Any function with an a-bit input and a b-bit output can be replaced by a table with $2^a$ b-bit entries, which defines the b-bit output for each one of the $2^a$ possible inputs.

Examples of functions which can be replaced with LUTs are as follows in this list of tables.

1. $L_P$
2. MulP(X)=PX
3. ModP(X)=X mod P
4. $L_P^{-1}$
5. H=$L_P^{-1}$∘ModP
6. Inv*
7. Aff*
8. Aff*$^{-1}$
9. SubBytes*=Aff*∘Inv*
10. InvSubBytes*=Inv*∘Aff*$^{-1}$
11. Two functions Mul$_n$*(X)=$L_P$(n)·X mod P, where n∈{0x2,0x3}, which are used in MixColumns*
12. Four functions Mul$_n$*(X), where n∈{0x9, 0xb, 0xd, 0xe}, which are used in InvMixColumns*
13. Two functions Mul$_n$*∘SubBytes*, where n∈{0x2, 0x3}
14. Four functions Mul$_n$*∘InvSubBytes*, where n∈{0x9, 0xb, 0xd, 0xe}

For example, with LUTs 1, 2, 5, 9, 13 of the above list for the AES encryption, the only calculations remaining beyond using the LUTs are XORs. Similarly, with LUTs 1, 2, 5, 10, 14 of the LUTs List for the AES decryption, the only calculations remaining beyond using the LUTs are XORs.

Advantageously, using LUTs makes it possible to dramatically decrease the redundancy level (e.g., from d=8 to d=3 or 4) and the power consumption and increase the maximal frequency, while preserving the same protection level, latency and performance. The improvement is applicable not only to AES, but also to other algorithms based on a finite field arithmetic, and in particular SM4, ARIA, and Camellia which use Sboxes similar to or the same as the AES Sbox.

A remark regarding tables 14 of the LUTs List (Mul$_n$*∘InvSubBytes*). In the AES decryption, InvMixColumns does not immediately follow InvSubBytes; rather, AddRoundKey is performed between them. However, due to the linearity of InvMixColumns one can write $$Inv\,Mix\,Columns\,(InvSub\,Bytes(X) \oplus Rk) =$$

$$Inv\,Mix\,Columns\,(InvSub\,Bytes(X)) \oplus Inv\,Mix\,Columns\,(Rk)$$

where X is a state and Rk is a round key, so if when expanding the key InvMixColumns(Rk) is precalculated, then the order of transformations in the runtime to InvSubBytes is effectively changed, then InvMixColumns, then AddRoundKey, and in the redundant domain it is possible to use LUTs for Mul$_n$*∘InvSubBytes* to calculate InvMixColumns*∘InvSubBytes*.

Some examples of table size optimizations follow.

In some implementations, for AES decryption, table 10 for InvSubBytes* may be dropped if the four tables 14 are used. This is due to the identity $1=0xe \oplus 0xb \oplus 0xd \oplus 0x9$; accordingly, $InvSubBytes^*(X) = Mul_{0xe}^{*} \circ InvSubBytes^*(X) \oplus Mul_{0xb}^{*} \circ InvSubBytes^*(X) \oplus Mul_{0xd}^{*} \circ InvSubBytes^*(X) \oplus Mul_{0x9}^{*} \circ InvSubBytes^*(X)$.

In some implementations, for AES encryption it is possible to use a table $Mul_n^*$ (or $Mul_n^* \circ SubBytes^*$) for $n=0x2$ only, but not for $n=0x3$, using the identity $Mul_{0x3}^*(X) = L_P(0x3) \cdot X = L_P(0x1) \cdot X \oplus L_P(0x2) \cdot X = X \oplus L_P(0x2) \cdot X = X \oplus Mul_{0x2}^*(X)$.

In some implementations, table 5 pertaining to $H = L_P^{-1} \circ ModP$ may be replaced with a smaller table, which will be denoted as table 15. Table 15 is created as follows:

Create the list T of $2^d$ polynomials RP, where R is an arbitrary polynomial of a degree less than d. Note that the values of the d most significant bits (MSBs) in these tables will all be different, and therefore assume all the possible $2^d$ values.

Sort T in lexicographical order. Now $\forall i (T_i \gg 8 = i)$, where $T_i$ stands for the $i^{th}$ entry of the sorted list T, and $\gg$ stands for the right shift.

In each entry, drop the d MSBs. The result is an additional LUT in the LUTs List from above:

15, Table T such that the set of values $(i \ll 8) + T_i$ is the set of all polynomials RP, where R is an arbitrary polynomial of a degree less than d.

Then for the AES encryption/decryption, instead of using tables 2.5 of the above list of LUTs, it is possible to use tables 4.0. An advantage is in replacing table 5 of the size $8 \cdot 2^{8+d}$ bits by table 0 of the size $8 \cdot 2^d$ bits (e.g., smaller by a factor of 256), and (less significantly) replacing table 2 of the size $(8+d) \cdot 2^8$ bits by table 4 of the size $8 \cdot 2^8$ bits.

In some implementations, for the initial randomization, instead of picking an entry number R in table 2, one may calculate $(R \ll 8) + T_R$, where T is table 0. In both cases one obtains a multiple of P. For the de-randomization table 0 is used as follows. Let X be a redundant byte, and its d MSBs. By the property of table 0, $Y = (d \ll 8) + T_d$ is a multiple of P. Then the d MSBs of $X \oplus Y$ are all zeros, and X and $X \oplus Y$ have the same remainder modulo P, therefore $X \oplus Y = X$ mod P.

In some implementations, when $P = P_0$ and $t = t_0$, then both tables 1 and 4 of the above list of LUTs represent the identity transformation and may be dropped.

FIG. 1 is a diagram that illustrates an example round 100 of encryption using lookup tables (LUTs) in a redundant basis. As shown in FIG. 1, input into the round 100 includes a state 105 and a round key 110. The state 105 is, in some implementations, a 4×4 column-major order array of 16 redundant bytes. If the round 100 is the first or initial round, the state 105 is derived from a plaintext input and the round key 110 is a cipher key. The cipher key is converted to the round key 110 using a key schedule.

As shown in FIG. 1, the round 100 includes as an initial operation an AddRoundKey*operation 115. The AddRoundKey*operation 115 is configured to combine redundant bytes (e.g., bytes in the redundant domain) of the state 105 with redundant bytes of the round key 110 to produce the state 120.

The next operation in round 100 is a ShiftRows* operation 125. The ShiftRows* operation 125 operates on the rows of the state 120 by cyclically shifting redundant bytes in each row by a certain offset to produce the state 130.

The next operation in round 100 is a composite SubBytes* and MixColumns* operation 135 on the state 130 that is performed using LUTs. The SubBytes* operation is a nonlinear substitution in which each redundant byte of a state is replaced with another redundant byte using a table known as a substitution box (S-box) to form another state. The MixColumns* operation is a linear mixing operation which operates on the columns of a state, combining the four redundant bytes in each column.

As shown in FIG. 1, the SubBytes* operation and the MixColumns* are composed as a combined MixColumns*°SubBytes* operation 135 on state 130 to produce state 140. Here, the MixColumns*°SubBytes* operation 135 is replaced with LUTs, e.g., at least some of the tables 1-15 as listed above, e.g., tables 9 and 11. In some implementations, a composite LUT (e.gf., table 13) is used to replace the operation MixColumns*°SubBytes*.

A result of replacing the MixColumns*°SubBytes* operation with LUTs is that the state 140 does not represent the state at the completed round. Rather, some XOR operations 145 are used to complete the state to be the input state 150 of the next round, or the final state of the last round.

In some implementations, in the last round of the encryption of the plaintext using the cipher key, there is no MixColumns* operation. Accordingly, table 9 may be used to replace the SubBytes* operation.

FIG. 1 illustrates an example encryption round. A decryption round is similar except that inverse functions are used, and accordingly tables 10 and 12 (or in some implementations, table 14) are used to replace a composite InvSubBytes*°InvMixColumns* function and InvSubBytes is used instead of SubBytes.

It is noted that FIG. 1 shows two state updates in a round. In some implementations, however, there may be more or less than two state updates per round. For example, there may be one, three, four, five, or more state updates per round.

Table 6 replaces the Inv* function. Till now, the redundant domain (the set of all the polynomials over GF(2) of degrees less than 8+d) has been regarded as the set of representatives of the ring GF(2)[x]/(PQ), and table 6 (Inv*) was constructed by raising to the power of 254 in this ring. However, if any multiples of P are XORed to the values in the table, this does not affect the table's validity, and therefore it is possible to build an alternative table without using any polynomial Q, as follows:

Build the table of inversion modulo P in GF(256) as a set of $2^8$ ordered pairs $\langle X, Inv(X) \rangle$, Replace every entry $\langle X, Inv(X) \rangle$ in the table with $2^d$ entries $\langle X \oplus RP, Inv(X) \rangle$, where each polynomial R is taken from the set of all the polynomials over GF(2) of degrees less than d. As a result, every polynomial of a degree less than 8+d will appear as the first element of one of the entries exactly once, Sort the entries in increasing order of their first elements, Drop the first element of the pair in each entry, Replace every entry Y with $Y \oplus RP$, where R is an arbitrary polynomial over GF(2) of degrees less than d.

In some implementations, it is ensured that every polynomial over GF(2) of a degree less than 8+d appears exactly once in this table, to prevent entropy loss. All the tables dependent on Inv* (tables 9, 10, 13, 14 of the list of tables) can be modified in a similar way.

In some implementations, it is possible to modify table 6 (Inv*) and the algorithm of the key expansion in the following way:

Choose a random A and B of a degree less than 8+d,

After the key expansion, XOR all the bytes of the expanded key with A. (In the case of A=0, there is no change in the standard key expansion), Transform the table (an ordered list of values $Y_X$, where X is the index in the list) into a list of ordered pairs $\langle X, Y \rangle$, i.e., add the index of every entry as the first element of the ordered pair, Replace every pair $\langle X, Y \rangle$ with $\langle X \oplus A \oplus B, Y \oplus B \rangle$. Every polynomial of a degree less than 8+d will still appear as the first element of one of the entries exactly once, Sort the entries in the increasing order of their first elements, Drop the first element of each entry.

All the tables dependent on Inv* (tables 9, 10, 13, 14 of the list of tables) can be modified in the same way.

With this change in the tables, in some implementations, one may XOR the constant B to each redundant byte of the input after its initial randomization. After this transformation, every byte X is represented by $H(X) \oplus B$ instead of $H(X)$. After AddRoundKey every byte X will be represented by $H(X) \oplus A \oplus B$. After the inversion or after the application of SubBytes* or of InvSubBytes* using the look-up table, every byte X will be represented by $H(X) \oplus B$. The application or MixColumns* or of InvMixColumns* preserves this property, since both MixColumn* and InvMixColumn* commute with XORing with a constant, in the sense that MixColumn*$(X_0 \oplus B, X_1 \oplus B, X_2 \oplus B, X_3 \oplus B)$=MixColumn*$(X_0, X_1, X_2, X_3) \oplus B$ and similarly for InvMixColumn*. Note that MixColumn* is the transformation of a single 4-byte column; MixColumns* consists of four such transformations, and similarly for InvMixColumn*. The same repeats at every round. After the last AddRoundKey every byte X will be represented $H(X) \oplus A \oplus B$, so before the de-randomization it is necessary to XOR $A \oplus B$ to every byte of the state.

In the above, similarly to the original RAMBAM scheme, the set or representations of an arbitrary byte b is $\{R \cdot L_P(b) | \dim(R) < d\}$. The usage of the multiplication of polynomials is essential in the original RAMBAM scheme, since Inv* is calculated there using multiplication in GF(2)[x]/(PQ). However, in the improved LUT version Inv* is found using a LUT rather than by calculation, and therefore it is possible to weaken the requirements to the set of representations. On the same occasion it is possible to get rid of $L_P$ (i.e., always use $P=P_0$), since the motivation for using $P \neq P_0$ is the desire to find pairs (P, Q) such that the Hamming weight of the product PQ is small, and thus the multiplication modulo PQ will require less gates, which is irrelevant in the LUT version.

In order to generalize, in some implementations, one drops the polynomial multiplication altogether, and sees V=GF(256) as a vector space of dimension 8 over GF(2), rather than as an extension field, and use a vector space U of dimension 8+d, rather than the ring GF(2)[x]/(PQ), as the redundant domain. To define a specific redundant representation, one chooses a homomorphism H: U→V, and all the $2^d$ preimages of an arbitrary byte are its redundant representations. If each element of V (which is a byte) is represented by 8 bits, and each element of U (a redundant byte) by 8+d bits, for simplicity one of the redundant representations of a byte b is set to the same value extended by the d most significant zeros. With this, the homomorphism H is uniquely defined by its kernel Ker(H) (i.e., $\{x \in U | H(x)=0\}$). Clearly, if x and y are different elements of Ker(H), then $x \oplus y \in V$ (otherwise $H(x \oplus y)=x \oplus y \neq 0$, in contradiction to the assumption that x and y are different).

Therefore, for each one out of $2^d$ combinations of the d most significant bits there is exactly one element of Ker(H) with this combination, and it is possible to represent Ker(H) by a table T with $2^d$ 8-bit entries, where each entry $T_i$=x corresponds to $(i \ll 8) \oplus x \in$ Ker(H).

The representations used in the original RAMBAM scheme are particular cases of this more general scheme, with Ker(H)=$\{RP|\dim(R)<d\}$, and table T is a generalization of table 0 described above.

Using this generalized scheme improves the robustness against high-order side-channel attacks and SIFA (Statistical Ineffective Fault Attack). For example, using the scheme based on the polynomial multiplication, the necessary condition to achieve robustness against second order attacks and against SIFA with faults in two bits simultaneously is d≥5, while in this suggested scheme the same goals may be achieved with d≥4.

When using the vector space instead of the ring, the following process is used to create table 15:

Create the list T of $2^d$ elements of Ker(H). Note that the values of the d most significant bits (MSBs) in these tables will all be different, and therefore assume all the possible $2^d$ values, Sort T in lexicographical order. Now $\forall i (T_i \gg 8 = i)$, where $T_i$ stands for the $i^{th}$ entry of the sorted list T, and $\gg$ stands for the right shift, In each entry, drop the d MSBs. The result is an additional LUT in the LUTs List from above:

15, Table T such that the set of values $(i \ll 8) + T_i$ is the set of all elements of Ker(H).

When using the vector space instead of the ring, the following process is used to build an alternative table for the Inv* function:

Build the table of inversion modulo P in GF(256) as a set of $2^8$ ordered pairs $\langle X, Inv(X) \rangle$, Replace every entry $\langle X, Inv(X) \rangle$ in the table with $2^d$ entries $\{\langle X \oplus \Delta, Inv(X) \rangle | \Delta \in Ker(H)\}$. As a result, each element of U will appear as the first element of one of the entries exactly once, Sort the entries in increasing order of their first elements, Drop the first element of the pair in each entry, Replace every entry Y with $Y \oplus \Delta$, where $\Delta$ is an arbitrary element of Ker(H).

In some implementations, it is ensured that each element of U appears exactly once in this table, to prevent entropy loss.

While in the RAMBAM approach functions $Mul_n*(X)$ are uniquely defined, in the vector space approach the only evident requirements on $Mul_n*(X)$ are as follows.

1) $H(Mul_n*(X))=Mul_n(H(X))$.

2) $Mul_n*(X)$ is a bijection (in order to prevent entropy loss).

In some implementations, in order to ensure the robustness of the scheme to side-channel attacks, it is ensured that MixColumns* and InvMixColumns* are bijections as well as $Mul_n*(X)$. A possible way to do so is as follows.

1) Define the functions $Mul_n*(X)$ as affine transformations, i.e. $Mul_n*(X)=M_n X+A_n$, where $M_n$ is some invertible matrix of size (8+d)×(8+d), and $A_n$ is an arbitrary vector of dimension 8+d.

2) Make sure that the matrix $$\begin{pmatrix} M_2 & M_3 & I & I \\ I & M_2 & M_3 & I \\ I & I & M_2 & M_3 \\ M_3 & I & I & M_2 \end{pmatrix}$$

of size 4(8+d)×4(8+d) which represents the linear part of the affine transformation MixColumns* is invertible (where I is the unit matrix). If not, then redefine $Mul_2^*(X)$ and $Mul_3^*(X)$ using different affine transformation—until the matrix $$\begin{pmatrix} M_2 & M_3 & I & I \\ I & M_2 & M_3 & I \\ I & I & M_2 & M_3 \\ M_3 & I & I & M_2 \end{pmatrix}$$

becomes invertible.

3) Make sure that the matrix $$\begin{pmatrix} M_e & M_b & M_d & M_9 \\ M_9 & M_e & M_b & M_d \\ M_d & M_9 & M_e & M_b \\ M_b & M_d & M_9 & M_e \end{pmatrix}$$

of size 4(8+d)×4(8+d) which represents the linear part of the affine transformation InvMixColumns* is invertible. If not, then redefine $Mul_e^*(X)$, $Mul_b^*(X)$, $Mul_d^*(X)$, $Mul_9^*(X)$, using different affine transformation—until the matrix $$\begin{pmatrix} M_e & M_b & M_d & M_9 \\ M_9 & M_e & M_b & M_d \\ M_d & M_9 & M_e & M_b \\ M_b & M_d & M_9 & M_e \end{pmatrix}$$

becomes invertible.

If tables 13 $Mul_n^*{\circ}SubBytes^*$, 14 $Mul_n^*{\circ}InvSubBytes^*$ are used then they should be built as follows:
  Build Tables 9 SubBytes*, 10 InvSubBytes*,
  Define functions $Mul_n^*(X)$ as described above,
  Build Tables 13, 14 which reflect the compositions $Mul_n^*{\circ}SubBytes^*$ and $Mul_n^*{\circ}InvSubBytes^*$ of already defined functions.

If the table $Mul_{0x3}^*/Mul_{0x3}^* \circ SubBytes^*$ is dropped as suggested above, then the calculation of InvMixColumn* becomes $Mul_2(x_o) \oplus Mul_2(x_1) \oplus x_1 \oplus x_2 \oplus x_3$ instead of $Mul_2(x_o) \oplus Mul_3(x_1) \oplus x_2 \oplus x_3$. One of the possible intermediate results (which may or may not be present in an actual implementation, depending on the order in which the expression is calculated) is $Mul_2(x_1) \oplus x_1 = (M_2 + I) \; x_1$. In order to obtain this intermediate result, if it is present, not to cause a leakage, it is possible to make sure that not only $M_2$ but also $M_2+I$ is invertible. Note that in the case d=1, it is impossible that both $M_2$ are $M_2+I$ are invertible, so in this case it is not recommended to drop the table $Mul_{0x3}^*/Mul_{0x3}^* \circ SubBytes^*$.

As mentioned previously, in the last round, there is no MixColumns*/InvMixColumns*. Moreover, 4 out of 16 bytes (bytes 0, 4, 8, 12) are not affected by ShiftRows. For these bytes, in AES encryption, a value x is typically replaced with $SubBytes^*(x) \oplus k$, where k is a fixed byte of the round key. The Hamming distance between x and $SubBytes^*(x) \oplus k$ is the Hamming weight of $x \oplus SubBytes^*(x) \oplus k$. If $x \oplus SubBytes^*(x)$ is not a bijection, then the side-channel trace related to this Hamming distance causes a leakage. Similarly, in AES decryption if $x \oplus InvSubBytes^*(x)$ is not a bijection, then the side-channel trace related to this Hamming distance causes a leakage.

One possible solution is to change the order of bytes in the internal registers after the last round so that no byte remains in place.

Another solution is using the following modification of the algorithm described above in its application to tables 9 SubBytes* and 10 InvSubBytes*:
  Build the table of SubBytesP (InvSubBytes) as a set of $2^8$ ordered pairs $\langle X, Y \rangle$,
  Replace every entry $\langle X, Y \rangle$ in the table with $2^d$ entries { $\langle X \oplus \Delta, Y \rangle | \Delta \in Ker(H)$}. As a result, every element of U will appear as the first element of one of the entries exactly once,
  For every $X \in GF(256)$:
    1) In each one of the $2^d$ entries in the set $M = \{\langle X \oplus \Delta, Y \rangle | \Delta \in Ker(H)\}$ replace the second element of the pair with $(Y \oplus \Delta')$, where $\Delta' \in Ker(H)$ and every element of Ker(H) is used exactly once,
    2) Verify that after this modification all the values $\{\Delta \oplus B | \langle A, B \rangle \in M\}$ are different,
    3) If the verification in step 2) fails, repeat from step 1) using a different permutation of the elements of Ker(H) for the second elements of the pairs, until the verification passes,
  Sort the entries in increasing order of their first elements,
  Drop the first element of the pair in each entry.

Figure 2:
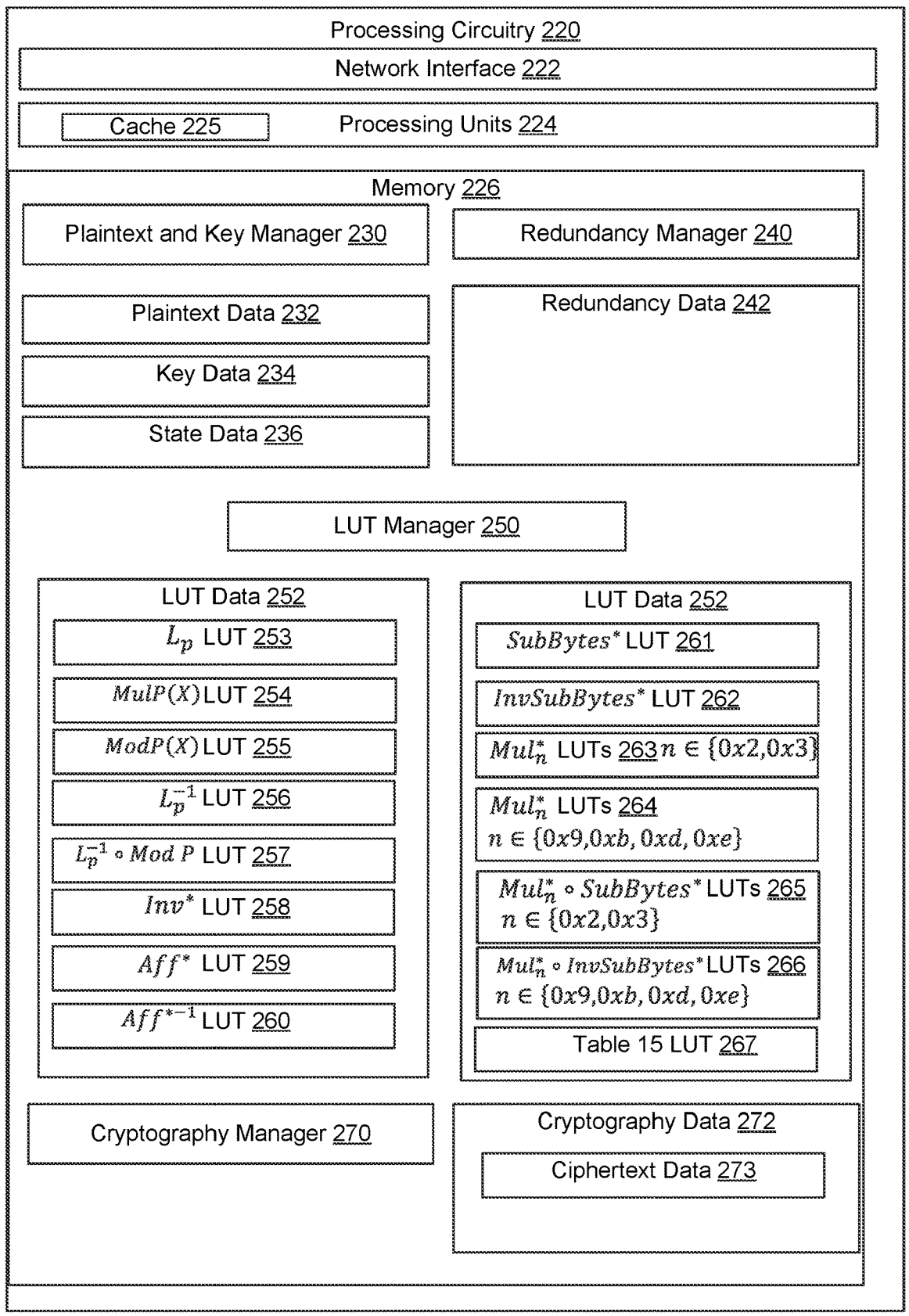
FIG. 2 is a diagram that illustrates an example electronic environment for performing the improved techniques described herein.

FIG. 2 is a diagram illustrating an example electronic environment for preventing side-channel attacks. The processing circuitry 220 includes a network interface 222, one or more processing units 224, and nontransitory memory (storage medium) 226.

In some implementations, one or more of the components of the processing circuitry 220 can be, or can include processors (e.g., processing units 224 having cache 225) configured to process subroutines stored in the memory 226 as a computer program product. Examples of such subroutines as depicted in FIG. 2 include plaintext and key manager 230, redundancy manager 240, LUT manager 250, and cryptography manager 270. Further, as illustrated in FIG. 2, the memory 226 is configured to store various data, which is described with respect to the respective services and managers that use such data.

The plaintext and key manager 230 is configured to receive and store plaintext and cipher key input for encryption by the cryptography manager 270, e.g., plaintext data 232 and key data 234.

The redundancy manager 240 is configured to convert bytes of the state data 236 into the redundant domain as redundancy data 242. As mentioned above, each byte has $2^d$ representations as an (8+d)-bit redundant byte. In some implementations, the redundant bytes are seen as polynomials over GF(2) modulo the product PQ (or, equivalently, representatives of the finite ring GF(2)[X]/(PQ) with degrees less than 8+d), and their multiplications are performed in the sense of this ring. For any redundant byte X, the byte represented by it can be calculated as $H(X) = L_P^{-1}(X \mod P)$.

In some implementations, one drops the polynomial multiplication altogether, and sees V=GF(256) as a vector space of dimension 8 over GF(2), rather than as an extension field, and use a vector space U of dimension 8+d, rather than the ring GF(2)[x]/(PQ), as the redundant domain. To define a specific redundant representation, one chooses a homomorphism H: U↦V, and all the $2^d$ preimages of an arbitrary byte are its redundant representations. If each element of V (which is a byte) is represented by 8 bits, and each element of U (a redundant byte) by 8+d bits, for simplicity one of the redundant representations of a byte b is set to the same value extended by the d most significant zeros. With this, the homomorphism H is uniquely defined by its kernel Ker(H) (i.e., $\{x \in U | H(x)=0\}$). Therefore, for each one out of $2^d$ combinations of the d most significant bits there is exactly one element of Ker(H) with this combination, and it is possible to represent Ker(H) by a table T with $2^d$ 8-bit entries, where each entry $T_i$=x corresponds to (i<<8) $\oplus$x$\in$Ker(H).

The LUT manager 250 is configured to generate the LUTs corresponding to various operations used in encrypting plaintext data 232 and decrypting ciphertext data 273. In some implementations, the LUTs are generated offline and are supplied as part of an executable. The LUT data 252 includes the LUTs relevant for representation in the ring GF(2)[x]/(PQ), which are as follows.

$L_P$ LUT 253 (table 1): $L_P$ is a linear transformation into the representation of the elements of GF(256) in the basis $\langle 1, t, t^2, \ldots, t^7 \rangle$, where t is a root of the polynomial P.

Mul P(X)=PX LUT 254 (table 2): This is an operator that multiplies by the polynomial P.

Mod P(X)=X mod P LUT 255 (table 3): This is an operator that takes a modulus P.

$L_P^{-1}$ LUT 256 (table 4): This is the inverse of $L_P$.

H=$L_p^{-1}\circ$ Mod P LUT 257 (table 5): This is an operator that produces a byte from a redundant byte.

Inv* LUT 258 (table 6): This is an inverse operator as described above.

Aff* LUT 259 (table 7): This is an affine transformation defined such that $\forall$X (H(Aff*(X))=Aff(H(X))).

Aff*$^{-1}$ LUT 260 (table 8): This is the inverse affine transformation.

SubBytes*=Aff*$\circ$Inv* LUT 261 (table 9): This is the SubBytes operator in the redundant domain.

InvSubBytes*=Inv*$\circ$Aff*$^{-1}$ LUT 262 (table 10): This is the inverse of the SubBytes operator used in decryption.

LUT 263 (table 11), which represents two functions $\text{Mul}_n^*(X)=L_P(n)$ X mod P, where n$\in$\{0x2,0x3\}, which are used in MixColumns*.

LUT 264 (table 12), which represents four functions $\text{Mul}_n^*(X)$, where n$\in$\{0x9, 0xb, 0xd, 0xe\}, which are used in InvMixColumns*.

LUT 265 (table 13), which represents two functions $\text{Mul}_n^*\circ$ SubBytes*, where n$\in$\{0x2,0x3\}.

LUT 266 (table 14), which represents four functions Mu*$_n\circ$InvSubBytes*, where n$\in$\{0x9, 0xb, 0xd, 0xe\}.

LUT 267 (table 15), which is described above.

For representation in a vector space under the homomorphism H: U$\mapsto$ V, some of the above tables are not used, for example, LUTs 253-257 (tables 1-5).

The cryptography manager 270 is configured to use the LUT data 262 (e.g., the LUTs 253-267) to perform encryption/decryption operations to produce cryptography data 272. For example, the cryptography manager 270 performs the operations described in FIG. 1 on the plaintext data 232 and key data 234 to produce ciphertext data 273. The use of the LUT data 262 along with operating in the redundant domain via redundancy manager 240 greatly decreases a likelihood of side-channel attacks. For encryption operations, the cryptography data 272 includes ciphertext data 273.

The components (e.g., modules, processing units 224) of processing circuitry 220 can be configured to operate based on one or more platforms (e.g., one or more similar or different platforms) that can include one or more types of hardware, software, firmware, operating systems, runtime libraries, and/or so forth. In some implementations, the components of the processing circuitry 220 can be configured to operate within a cluster of devices (e.g., a server farm). In such an implementation, the functionality and processing of the components of the processing circuitry 220 can be distributed to several devices of the cluster of devices.

The components of the processing circuitry 220 can be, or can include, any type of hardware and/or software configured to process private data from a wearable device in a split-compute architecture. In some implementations, one or more portions of the components shown in the components of the processing circuitry 220 in FIG. 2 can be, or can include, a hardware-based module (e.g., a digital signal processor (DSP), a field programmable gate array (FPGA), a memory), a firmware module, and/or a software-based module (e.g., a module of computer code, a set of computer-readable instructions that can be executed at a computer). For example, in some implementations, one or more portions of the components of the processing circuitry 220 can be, or can include, a software module configured for execution by at least one processor (not shown) to cause the processor to perform a method as disclosed herein. In some implementations, the functionality of the components can be included in different modules and/or different components than those shown in FIG. 2, including combining functionality illustrated as two components into a single component.

The network interface 222 includes, for example, wireless adaptors, and the like, for converting electronic and/or optical signals received from the network to electronic form for use by the processing circuitry 220. The set of processing units 224 include one or more processing chips and/or assemblies. The memory 226 includes both volatile memory (e.g., RAM) and non-volatile memory, such as one or more ROMs, disk drives, solid state drives, and the like. The set of processing units 224 and the memory 226 together form processing circuitry, which is configured and arranged to carry out various methods and functions as described herein.

Although not shown, in some implementations, the components of the processing circuitry 220 (or portions thereof) can be configured to operate within, for example, a data center (e.g., a cloud computing environment), a computer system, one or more server/host devices, and/or so forth. In some implementations, the components of the processing circuitry 220 (or portions thereof) can be configured to operate within a network. Thus, the components of the processing circuitry 220 (or portions thereof) can be configured to function within various types of network environments that can include one or more devices and/or one or more server devices. For example, the network can be, or can include, a local area network (LAN), a wide area network (WAN), and/or so forth. The network can be, or can include, a wireless network and/or wireless network implemented using, for example, gateway devices, bridges, switches, and/or so forth. The network can include one or more segments and/or can have portions based on various protocols such as Internet Protocol (IP) and/or a proprietary protocol. The network can include at least a portion of the Internet.

In some implementations, one or more of the components of the processing circuitry 220 can be, or can include, processors configured to process instructions stored in a memory. For example, plaintext and key manager 230 (and/or a portion thereof), redundancy manager 240 (and/or a portion thereof), LUT manager 250 (and/or a portion thereof), and cryptography manager 270 (and/or a portion thereof) are examples of such instructions.

In some implementations, the memory 226 can be any type of memory such as a random-access memory, a disk drive memory, flash memory, and/or so forth. In some implementations, the memory 226 can be implemented as more than one memory component (e.g., more than one RAM component or disk drive memory) associated with the components of the processing circuitry 220. In some implementations, the memory 326 can be a database memory. In some implementations, the memory 226 can be, or can include, a non-local memory. For example, the memory 226 can be, or can include, a memory shared by multiple devices (not shown). In some implementations, the memory 226 can be associated with a server device (not shown) within a network and configured to serve the components of the processing circuitry 220. As illustrated in FIG. 2, the memory 226 is configured to store various data, including plaintext data 232, redundancy data 242, LUT data 252, and cryptography data 272.

A LUT version of RAMBAM can be implemented in hardware and can be implemented in software. In both cases one of their advantages is eliminating intermediate results, in particular intermediate results of the calculations of Inv*, which typically are the major source of side channel leakage. As a result, low redundancies can be considered, starting from d=2.

If implemented in hardware, the LUTs (which replace computational logic) can be placed in one or more ROMs or RAMs. The additional advantages of LUT versions of RAMBAM implemented in hardware are as follows:

A shorter critical path—and, consequently, higher maximal clock frequency,

Lower chip area because of the high density of ROMs and the elimination of part of the computational logic. (For high redundancies it will not work, because the ROM area in the LUT version grows exponentially as a function of the redundancy—unlike the computational logic whose area grows much slower. However, for low redundancies the chip area is likely to decrease.)

If implemented in software, an additional advantage of the LUT versions is a dramatic increase in performance. However, in certain settings attacks of a different kind—cache attacks—may threaten software implementations of LUT versions of RAMBAM. The following discusses the table alignment, tradeoffs between the total size of the tables and the amount of computations for further increasing the performance, and possible countermeasures against cache attacks.

Denote a set S of (8+d)-bit values as bitwise uniform if for any bit position i between 0 and 7+d, the values of the bits in position i in all of the elements of S are distributed uniformly (i.e., exactly half of them are 0s, and half are 1s). For all the polynomials with d≥5, and for certain polynomials with smaller values of d, starting from d=2, the set of representations of any byte X is bitwise uniform, and this is important for the robustness to side-channel analysis (SCA).

When a LUT T is implemented in software, the address of the $Y^{th}$ table entry is $B+2^k Y$, where B is the base address of the table and $2^k$ is the entry size. Even when for any byte X the set S of all its representations is bitwise uniform, the set of the corresponding table addresses $\{B+2^k Y | Y \in S\}$ is not bitwise uniform in the general case. To ensure that this set of addresses is bitwise uniform, the table is aligned in the memory so that the 8+d+k least significant bits of the base address B are zeros.

It turns out, however, that 7+d+k zeros are enough—if the offsets are added to a base address with a "1" bit in the position corresponding to the most significant position of the offsets, then the carry bit is not used and will not cause a leakage.

It is noted that increasing the size of the tables and simultaneously decreasing the amount of computations does not necessarily improve the performance, because if the cache 225 is not large enough, then the increase of the total size of the tables may increase the amount of cache misses and adversely affect the performance more significantly than decreasing the amount of computations. Nevertheless, if cache 225 is large enough the suggested tradeoffs may be worthwhile.

For example, when an entry with a specific offset in any one of the four tables of LUT 264 (represents four functions $Mul_n^*(X)$, where $n \in \{0x9, 0xb, 0xd, 0xe\}$) is accessed, the entries with the same offset in the remaining four tables are typically accessed as well. Therefore, merging the four tables into a single table, in which every entry contains a quadruple $\langle Mul_{0xe}(X), Mul_{0xb}(X), Mul_{0xd}(X), Mul_{0x9}(X) \rangle$ will decrease the number of cache lines which have to be read. Additionally, the CPU may be able to read the entire quadruple into a single register of a larger size and XOR two such quadruples in a single CPU instruction. The same transformation can also be applied to LUTs 265 and 266. This transformation does not increase the total size of the tables and saves the calculations and the memory reading operations.

Similarly, it is possible to merge tables $Mul_n^*$ where $n \in \{0x2, 0x3\}$, into one table, with quadruples $\langle Mul_{0x2}(X), Mul_{0x3}(X), X, X \rangle$ as its entries. (For tables $Mul_n^* \circ SubBytes^*$, the entries will be $\langle Mul_{0x2} \circ SubBytes(X), Mul_{0x3} \circ SubBytes(X), SubBytes(X), SubBytes(X) \rangle$. Unlike the above transformation, this transformation doubles the table size, so whether this transformation is worthwhile depends on the cache size. Alternatively, it is possible to drop the LUT for $Mul_{0x3} \circ SubBytes(X)$ altogether, and use a table with entries $\langle Mul_{0x2} \circ SubBytes(X), SubBytes(X) \rangle$.

After merging the tables as described above, it is possible to add three additional tables, in which the entries contain the same quadruples, rotated by 1, 2 and 3 positions. Then it is possible to perform the table search for each byte of a column in a different column, so that the results can be XORed as is, without additional rotations, to produce the mixed column. Whether this transformation is worthwhile depends on the size of cache 225.

The redundancy of the tables in and of itself complicates cache attacks. In an unprotected table implementation of AES, for every hypothesis regarding the value of a byte, the attacker can predict a specific entry in the table which is expected to be accessed. With redundancy, the attacker knows that one of $2^d$ entries is expected to be accessed, but does not know which one, which complicates the attacks and adds noise. However, if cache attacks are included into the threat model, one may use one of the following countermeasures.

Moving the tables in runtime. It is possible to copy the tables used to random locations in runtime. For example, while the tables are being used for AES, another thread simultaneously copies the tables to a different location—and changes the pointers to the tables when the copying is finished. This thread can work in an endless loop. The attacker will have to constantly update the pointers to the tables in his attacking process, in order to be able to target the correct cache lines. Alternatively (here and below) it is possible to copy small chunks of the tables (e.g., a fixed number of entries) before or after each AES encryption/decryption.

Table randomization in runtime. When moving the table to a different location, it is possible to rebuild it as described in above with a different randomization. This does not seem to help by itself because the set of $2^d$ cache entries, one of which is expected to be accessed given a specific hypothesis, remains the same. The next section suggests a further or alternative transformation which overcomes this problem.

XOR-ing constants with the address and with the data while randomizing the tables. When moving the table to a different location, it is possible to randomly choose (8+d)-bit values A and B and build the tables according to analysis above. Unlike above, here the AES process must be aware of the change in the pointers of the tables, because when using a new table, it is necessary to obtain the values A and B and to change the key expansion and the data's initial randomization and de-randomization in accordance. If it is desirable not to change the expanded key, use A=0. The advantage of XOR-ing the constants is that in this case the attacker needs to know not only the pointers to the tables, but also the values A and B, to be able to find the correct target cache lines.

If the side channel trace, e.g., the power consumption of memory accesses is constant and does not depend on the address and on the data, then the LUT based AES with fixed tables either in RAM or in ROM should be adequately protected. However, in many existing memories the power consumption of memory accesses is variable. In the following additional security layers are suggested depending on the memory leakage model. These security layers are relevant for both hardware and software implementations.

Table Shuffling: If the power consumption of a memory access depends on the address and/or on the data being read, then the leakage caused by memory accesses may be exploited for a side-channel attack. In this case, it is possible to XOR constants with both the addresses and the data in the LUT as suggested above, and randomly change these constants in runtime as a countermeasure against cache attacks on software implementations. Of course, this defense requires storing the tables in RAM rather than in ROM, in order to be able to change them. More specifically, instead of a single table, two slots for two table copies (denoted T0 and T1) are needed. Initially the table is placed in T0. Random addr_offset and data_offset are chosen, and the data is gradually copied from T0 to T1, while applying addr_offset and data_offset as follows: T1[i]=T0[i⊕addr_offset]⊕data_offset. As long as the copying from T0 to T1 is going on, table T0 is used for the protected encryption algorithm. As soon as the copying is finished, the roles of the slots switch—T1 becomes the slot used in the protected encryption algorithm, new random addr_offset and data_offset are chosen, and T1 is gradually copied to T0. The copying of the tables can be performed either (a) asynchronously to AES, or (b) a number of entries is copied along with each protected encryption algorithm invocation.

Dummy reads interspersed with real reads: XOR-ing with random constants ensures that both the address in the table and the data read from the table are distributed randomly and uniformly, independently of the clear byte value. However, the XORs between two sequential accessed addresses and between the data read from these addresses, do depend on the clear data, and the corresponding leakage may be exploited for a side-channel attack. In order to avoid it, it is possible to add one or more dummy read accesses between two consecutive read accesses required by the algorithm (real reads). The addresses for the dummy read accesses may be chosen at random or by a deterministic algorithm, e.g., equal increments of the address.

Dummy reads in parallel with real reads: A disadvantage of adding dummy reads as described in the previous section is that they slow down the calculation. Alternatively, it is possible to use more than two slots, for example T0, T1, and T2. At every moment one of the slots is not in use (it is the target of the ongoing copying the table with shuffling), while all other slots are in use. In order to accelerate the encryption, it should be possible to access all the slots in parallel (e.g., they may be placed in separate RAMs with several memory controllers). The slot used for real reads (the active slot) is chosen at each clock cycle in the cyclic order. At each clock cycle, a dummy read is performed from each non-active slot in use (with at least three slots, there always is at least one non-active slot in use). As in the previous section, the addresses for the dummy read accesses may be chosen at random or by a deterministic algorithm, e.g., equal increments of the address.

Figure 3:
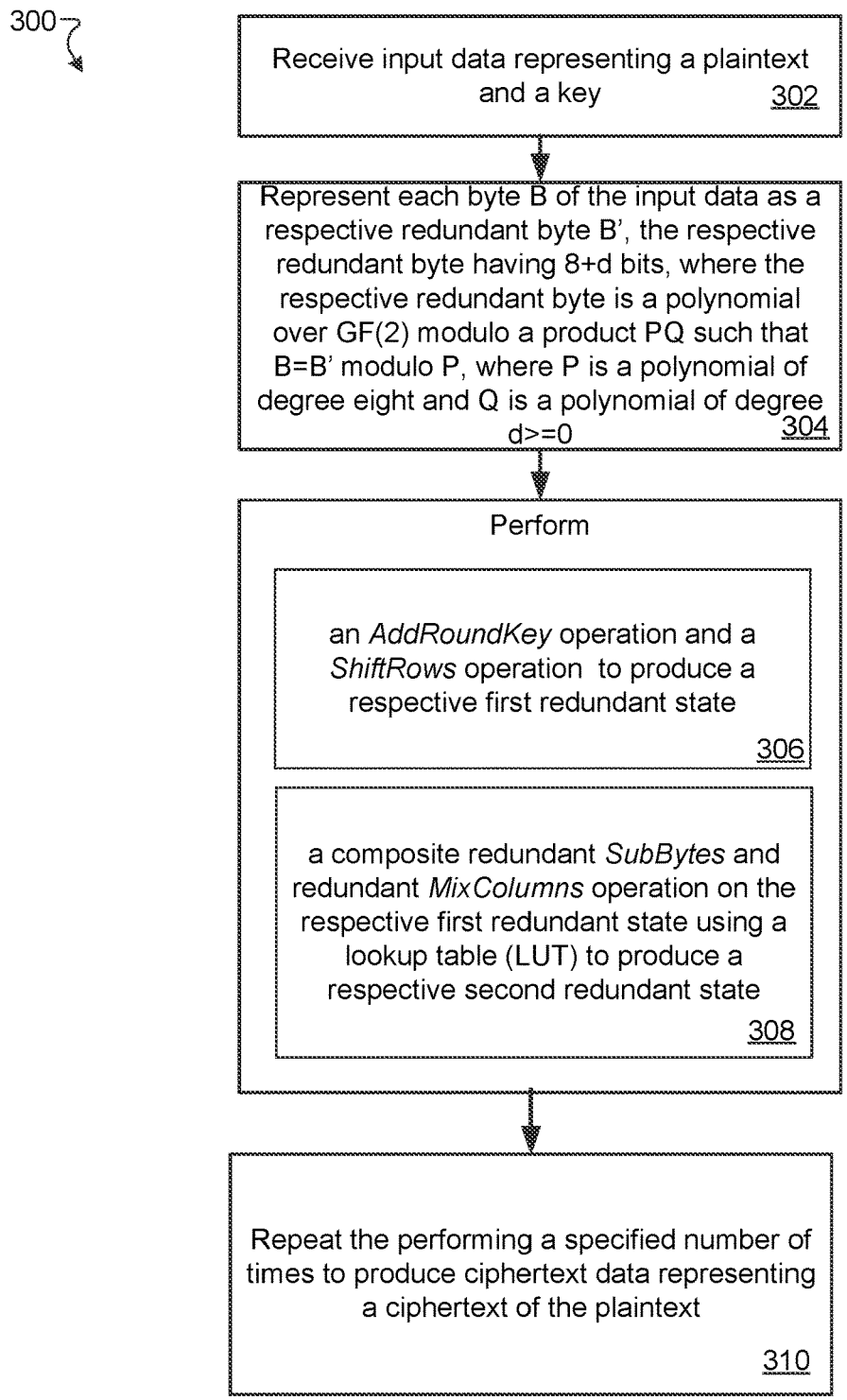
FIG. 3 is a flow chart that illustrates an example method of performing encryption according to the improved techniques described herein.

FIG. 3 is a flow chart illustrating an example method 300 for performing cryptographic operations using LUTs in a redundant domain. The method 300 may be performed using the processing circuitry 220 of FIG. 2.

At 302, the plaintext and key manager 230 receives input data representing one of a plaintext or a ciphertext, and a key. For example, when the input data represents a plaintext and a key, the operations are for encryption. When the input data represents a ciphertext and a key, the operations are for decryption.

At 304, the redundancy manager 240 represents each byte B of the input data as a respective redundant byte B', the respective redundant byte having 8+d bits, where the respective redundant byte is a polynomial over GF(2) modulo a product PQ such that B=B'modulo P, where P is a polynomial of degree eight and Q is a polynomial of degree d≥0.

At 306, the cryptography manager 270 performs an AddRoundKey operation and a ShiftRows operation to produce a respective first redundant state.

At 308, the cryptography manager 270 performs one of a composite redundant SubBytes and redundant MixColumns operation or a composite redundant InvSubBytes and redundant InvMixColumns on the respective first redundant state using a lookup table (LUT) to produce a respective second redundant state. When the cryptography manager 270 performs the composite redundant SubBytes and redundant MixColumns operation, the cryptography manager 270 is performing an encryption operation. When the cryptography manager 270 performs the composite redundant InvSubBytes and redundant InvMixColumns operation, the cryptography manager 270 is performing a decryption operation.

At 310, the cryptography manager 270 repeats the performing a specified number of times to produce output data representing one of a ciphertext or a plaintext from the respective second redundant state.

Figure 4:
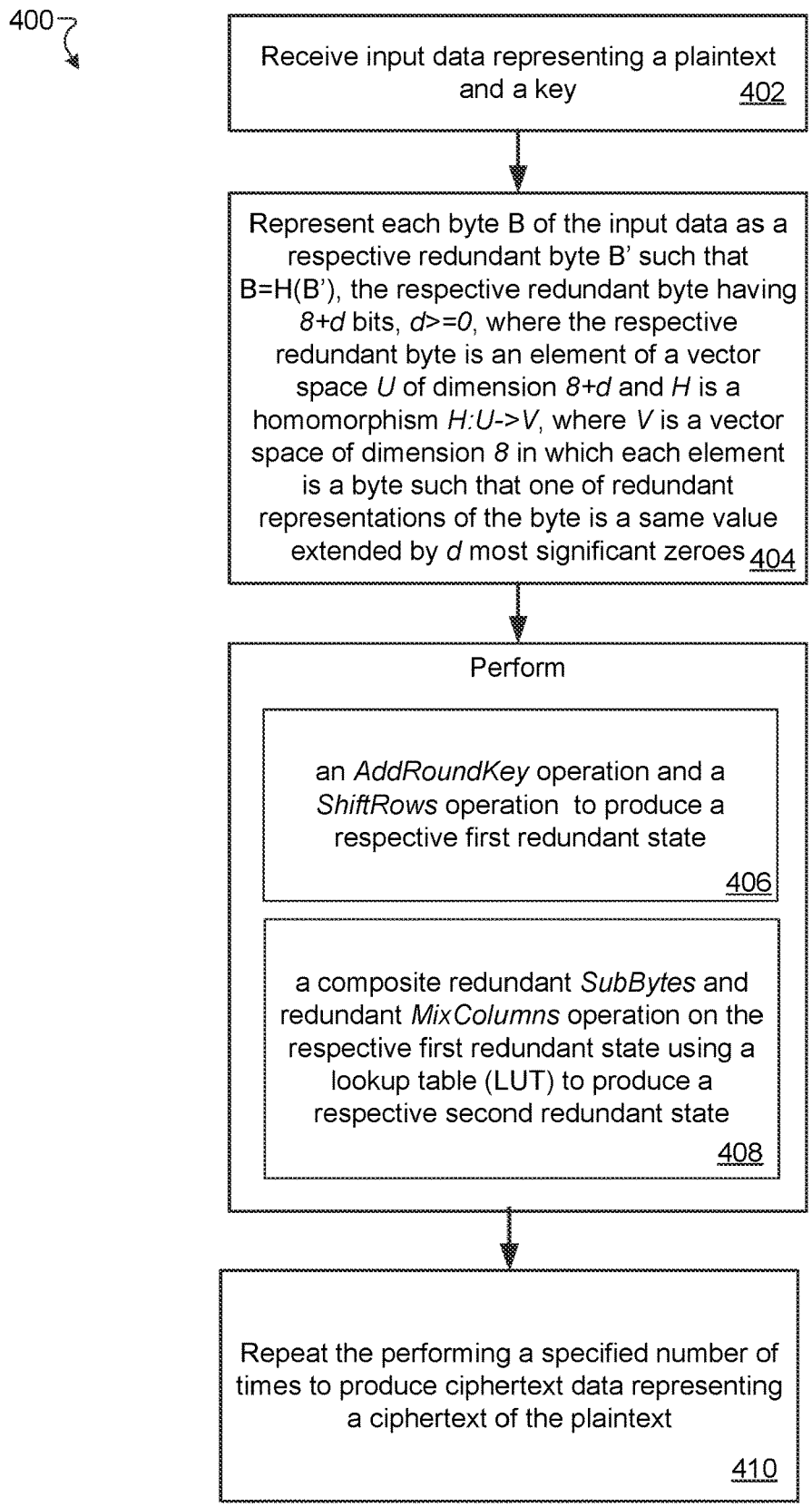
FIG. 4 is a flow chart that illustrates an example method of performing encryption according to the improved techniques described herein.

FIG. 4 is a flow chart illustrating an example method 400 for performing cryptographic operations using LUTs in a redundant domain. The method 400 may be performed using the processing circuitry 220 of FIG. 2.

At 402, the plaintext and key manager 230 receives input data representing one of a plaintext or a ciphertext, and a key. For example, when the input data represents a plaintext and a key, the operations are for encryption. When the input data represents a ciphertext and a key, the operations are for decryption.

At 404, the redundancy manager 240 represents each byte B of the input data as a respective redundant byte B' such that B=H(B'), the respective redundant byte having 8+d bits, d≥0, where the respective redundant byte is an element of a vector space U of dimension 8+d and H is a homomorphism H: U↦V, where V is a vector space of dimension 8 in which each element is a byte such that one of redundant representations of the byte is a same value extended by d most significant zeroes.

At 406, the cryptography manager 270 performs an AddRoundKey operation and a ShiftRows operation to produce a respective first redundant state.

At 408, the cryptography manager 270 performs one of a composite redundant SubBytes and redundant MixColumns operation or a composite redundant InvSubBytes and redundant InvMixColumns on the respective first redundant state using a lookup table (LUT) to produce a respective second redundant state. When the cryptography manager 270 performs the composite redundant SubBytes and redundant MixColumns operation, the cryptography manager 270 is performing an encryption operation. When the cryptography manager 270 performs the composite redundant InvSubBytes and redundant InvMixColumns operation, the cryptography manager 270 is performing a decryption operation.

At 410, the cryptography manager 270 repeats the performing a specified number of times to produce output data representing one of a ciphertext or a plaintext from the respective second redundant state.

Specific structural and functional details disclosed herein are merely representative for purposes of describing example embodiments. Example embodiments, however, may be embodied in many alternate forms and should not be construed as limited to only the embodiments set forth herein.

The terminology used herein is for the purpose of describing particular embodiments only and is not intended to be limiting of the embodiments. As used herein, the singular forms "a," "an," and "the" are intended to include the plural forms as well, unless the context clearly indicates otherwise. It will be further understood that the terms "comprises," "comprising," "includes," and/or "including," when used in this specification, specify the presence of the stated features, steps, operations, elements, and/or components, but do not preclude the presence or addition of one or more other features, steps, operations, elements, components, and/or groups thereof.

It will be understood that when an element is referred to as being "coupled," "connected," or "responsive" to, or "on," another element, it can be directly coupled, connected, or responsive to, or on, the other element, or intervening elements may also be present. In contrast, when an element is referred to as being "directly coupled," "directly connected," or "directly responsive" to, or "directly on," another element, there are no intervening elements present. As used herein the term "and/or" includes any and all combinations of one or more of the associated listed items.

Spatially relative terms, such as "beneath," "below," "lower," "above," "upper," and the like, may be used herein for ease of description to describe one element or feature in relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the term "below" can encompass both an orientation of above and below. The device may be otherwise oriented (rotated 70 degrees or at other orientations) and the spatially relative descriptors used herein may be interpreted accordingly.

Example embodiments of the concepts are described herein with reference to cross-sectional illustrations that are schematic illustrations of idealized embodiments (and intermediate structures) of example embodiments. As such, variations from the shapes of the illustrations as a result, for example, of manufacturing techniques and/or tolerances, are to be expected. Thus, example embodiments of the described concepts should not be construed as limited to the particular shapes of regions illustrated herein but are to include deviations in shapes that result, for example, from manufacturing. Accordingly, the regions illustrated in the figures are schematic in nature and their shapes are not intended to illustrate the actual shape of a region of a device and are not intended to limit the scope of example embodiments.

It will be understood that although the terms "first," "second," etc. may be used herein to describe various elements, these elements should not be limited by these terms. These terms are only used to distinguish one element from another. Thus, a "first" element could be termed a "second" element without departing from the teachings of the present embodiments.

Unless otherwise defined, the terms (including technical and scientific terms) used herein have the same meaning as commonly understood by one of ordinary skill in the art to which these concepts belong. It will be further understood that terms, such as those defined in commonly used dictionaries, should be interpreted as having a meaning that is consistent with their meaning in the context of the relevant art and/or the present specification and will not be interpreted in an idealized or overly formal sense unless expressly so defined herein.

While certain features of the described implementations have been illustrated as described herein, many modifications, substitutions, changes, and equivalents will now occur to those skilled in the art. It is, therefore, to be understood that the appended claims are intended to cover such modifications and changes as fall within the scope of the implementations. It should be understood that they have been presented by way of example only, not limitation, and various changes in form and details may be made. Any portion of the apparatus and/or methods described herein may be combined in any combination, except mutually exclusive combinations. The implementations described herein can include various combinations and/or sub-combinations of the functions, components, and/or features of the different implementations described.

What is claimed is:

1. A method comprising:
  receiving input data representing one of a plaintext or a ciphertext, and a key;
  representing each byte B of the input data as a respective redundant byte B', the respective redundant byte having 8+d bits, where the respective redundant byte B' is a polynomial over GF(2) modulo a product PQ such that B=B' modulo P, where P is a polynomial of degree eight and Q is a polynomial of degree d≥0;
  performing:
    an AddRoundKey operation and a ShiftRows operation to produce a respective first redundant state; and
    one of a composite redundant SubBytes and redundant MixColumns operation or a composite redundant InvSubBytes and redundant InvMixColumns on the respective first redundant state using a lookup table (LUT) to produce a respective second redundant state; and repeating the performing a specified number of times to produce output data representing one of a ciphertext or a plaintext from the respective second redundant state.

2. The method as in claim 1, further comprising:
performing a transformation on the respective redundant byte to produce the byte the respective redundant byte represents by using a LUT for the transformation.

3. The method as in claim 2, wherein the LUT for the transformation is replaced with another LUT, the another LUT being created from a list of $2^d$ polynomials RP, where R is an arbitrary polynomial of a degree less than d.

4. The method as in claim 1, wherein a LUT for a redundant SubBytes operation is expressed in terms of LUTs for two redundant composite $\text{Mul}_n$ and redundant SubBytes operations.

5. The method as in claim 1, wherein a LUT for a redundant InvSubBytes operation is expressed in terms of LUTs for four redundant composite $\text{Mul}_n$ and redundant InvSubBytes operations.

6. The method as in claim 1, wherein a redundant inverse operation (Inv) is replaced by a LUT for an inverse operation that includes entries that are elements of a ring GF(2)[x]/(PQ) raised to a power of 254 in the ring.

7. The method as in claim 6, wherein, in the LUT for the inverse operation, each entry LUT[X] is replaced with the entry Inv[X⊕A⊕B]⊕B, where A and B are random polynomials of degree less than 8+d and ⊕ is a XOR operator.

8. The method as in claim 1, wherein the LUT is implemented in software.

9. The method as in claim 8, wherein an address of a Yth entry of the LUT is B+$2^k$Y, where B is a base address of the LUT and $2^k$ is a size of the Yth entry.

10. The method as in claim 9, further comprising:
aligning the LUT in memory so that 7+d+k least significant bits of the base address B are zeros.

11. The method as in claim 8, further comprising:
merging LUTs for a redundant operation $\text{Mul}_n$, where n∈{0x9, 0xb, 0xd, 0xe}, into a single LUT.

12. The method as in claim 8, further comprising:
merging LUTs for a redundant operation $\text{Mul}_n$, where n∈{0x2, 0x3}, into a single LUT.

13. The method as in claim 8, further comprising:
copying the LUT to a random location in memory in runtime.

14. The method as in claim 1, further comprising:
storing two copies of the LUT, $T_0$ and $T_1$, in a random-access memory (RAM).

15. The method as in claim 14, further comprising:
performing:
generating random address offsets addr_offset1 and addr_offset2 and random data address offsets data_offset1 and data_offset2;
a copy of $T_0$ to $T_1$ where an ith entry in a copy of the LUT $T_1[i]=T_0[i\oplus\text{addr\_offset1}]\oplus\text{data\_offset1}$, where ⊕ is a XOR operator; and
a copy of $T_1$ to $T_0$, where an ith entry in a copy of the LUT $T_0[i]=T_1[i\oplus\text{addr\_offset2}]\oplus\text{data\_offset2}$; and
repeating the performing indefinitely.

16. The method as in claim 14, further comprising performing at least one dummy read on one of the copies of the LUT.

17. The method as in claim 16, further comprising storing an additional copy $T_2$ of the LUT in the RAM, wherein the at least one dummy read is performed in parallel with at least one real read of the copies of the LUT.

18. A method, comprising:
receiving input data representing one of a plaintext or a ciphertext, and a key;
representing each byte B of the input data as a respective redundant byte B', the respective redundant byte having 8+d bits, d≥0, where the respective redundant byte is an element of a vector space U of dimension 8+d such that B=H(B') where H is a homomorphism H: U↦V, where V is a vector space of dimension 8 in which each element is a byte such that one of redundant representations of the byte is a same value extended by d most significant zeroes;
performing:
an AddRoundKey operation and a ShiftRows operation to produce a respective first redundant state; and
one of a composite redundant SubBytes and redundant MixColumns operation or a composite redundant InvSubBytes and redundant InvMixColumns on the respective first redundant state using a lookup table (LUT) to produce a respective second redundant state; and
repeating the performing a specified number of times to produce output data representing one of a ciphertext or a plaintext from the respective second redundant state.

19. The method as in claim 18, further comprising:
performing a transformation on the respective redundant byte to produce the byte the respective redundant byte represents by using a LUT for the transformation.

20. The method as in claim 19, wherein the LUT for the transformation is replaced with another LUT, the another LUT being created from a list of $2^d$ elements of a kernel of H.

21. The method as in claim 18, further comprising:
verifying whether a matrix $$\begin{pmatrix} M_2 & M_3 & I & I \\ I & M_2 & M_3 & I \\ I & I & M_2 & M_3 \\ M_3 & I & I & M_2 \end{pmatrix},$$

where I is a unit matrix, $M_2$ is a matrix defined by redundant $\text{Mul}_2$ (X)=$M_2X+A_2$, and $M_3$ is a matrix defined by redundant $\text{Mul}_3$ (X)=$M_3X+A_3$ for X∈U, is invertible.

22. The method as in claim 18, further comprising:
verifying whether a matrix $$\begin{pmatrix} M_e & M_b & M_d & M_9 \\ M_9 & M_e & M_b & M_d \\ M_d & M_9 & M_e & M_b \\ M_b & M_d & M_9 & M_e \end{pmatrix},$$

where $M_9$ is a matrix defined by redundant $\text{Mul}_9$ (X)=$M_9X+A_9$, $M_b$ is a matrix defined by redundant $\text{Mul}_b$ (X)=$M_bX+A_b$, $M_d$ is a matrix defined by redundant $\text{Mul}_d$ (X)=$M_dX+A_d$, and $M_e$ is a matrix defined by redundant $\text{Mul}_e$ (X)=$M_eX+A_e$ for X∈U, is invertible.

23. A computer program product comprising a non-transitory storage medium, the computer program product including code that, when executed by processing circuitry, causes the processing circuitry to perform a method, the method comprising:

receiving input data representing one of a plaintext or a ciphertext, and a key;

representing each byte B of the input data as a respective redundant byte B', the respective redundant byte having 8+d bits, where the respective redundant byte is a polynomial over GF(2) modulo a product PQ such that B=B' modulo P, where P is a polynomial of degree eight and Q is a polynomial of degree d≥0;

performing:
   an AddRoundKey operation and a ShiftRows operation to produce a respective first redundant state; and
   one of a composite redundant SubBytes and redundant MixColumns operation or a composite redundant InvSubBytes and redundant InvMixColumns on the respective first redundant state using a lookup table (LUT) to produce a respective second redundant state; and repeating the performing a specified number of times to produce output data representing one of a ciphertext or a plaintext from the respective second redundant state.

24. The computer program product as in claim 23, wherein the method further comprises:
performing a transformation on the respective redundant byte to produce the byte the respective redundant byte represents by using a LUT for the transformation.

25. The computer program product as in claim 24, wherein the LUT for the transformation is replaced with another LUT, the another LUT being created from a list of $2^d$ polynomials RP, where R is an arbitrary polynomial of a degree less than d.

26. The computer program product as in claim 23, wherein a LUT for a redundant InvSubBytes operation is expressed in terms of LUTs for four redundant composite $Mul_n$ and redundant InvSubBytes operations.

27. The computer program product as in claim 23, wherein a redundant inverse operation (Inv) is replaced by a LUT for an inverse operation that includes entries that are elements of a ring GF(2)[x]/(PQ) raised to a power of 254 in the ring.

28. An electronic apparatus, the electronic apparatus comprising:
memory; and
processing circuitry coupled to the memory, the processing circuitry being configured to:
   receive input data representing one of a plaintext or a ciphertext, and a key;
   represent each byte B of the input data as a respective redundant byte B', the respective redundant byte having 8+d bits, where the respective redundant byte is a polynomial over GF(2) modulo a product PQ such that B=B' modulo P, where P is a polynomial of degree eight and Q is a polynomial of degree d≥0;
   perform:
      an AddRoundKey operation and a ShiftRows operation to produce a respective first redundant state; and
      one of a composite redundant SubBytes and redundant MixColumns operation or a composite redundant InvSubBytes and redundant InvMixColumns on the respective redundant state using a lookup table (LUT) to produce a respective second redundant state; and
   repeat the performing a specified number of times to produce output data representing one of a ciphertext or a plaintext from the respective second redundant state.

29. The electronic apparatus as in claim 28, wherein the processing circuitry is further configured to:
perform a transformation on the respective redundant byte to produce the byte the respective redundant byte represents by using a LUT for the transformation.

30. The electronic apparatus as in claim 29, wherein the LUT for the transformation is replaced with another LUT, the another LUT being created from a list of $2^d$ polynomials RP, where R is an arbitrary polynomial of a degree less than d.

31. The electronic apparatus as in claim 28, wherein a LUT for a redundant InvSubBytes operation is expressed in terms of LUTs for four redundant composite $Mul_n$ and redundant InvSubBytes operations.

32. The electronic apparatus as in claim 28, wherein a redundant inverse operation (Inv) is replaced by a LUT for an inverse operation that includes entries that are elements of a ring GF(2)[x]/(PQ) raised to a power of 254 in the ring.

33. A computer program product comprising a non-transitory storage medium, the computer program product including code that, when executed by processing circuitry, causes the processing circuitry to perform a method, the method comprising:
receiving input data representing one of a plaintext or a ciphertext, and a key;
representing each byte B of the input data as a respective redundant byte B', the respective redundant byte having 8+d bits, d≥0, where the respective redundant byte is an element of a vector space U of dimension 8+d such that B=H(B') where H is a homomorphism H: U↦ V, where V is a vector space of dimension 8 in which each element is a byte such that one of redundant representations of the byte is a same value extended by d most significant zeroes;
performing:
   an AddRoundKey operation and a ShiftRows operation to produce a respective first redundant state; and
   one of a composite redundant SubBytes and redundant MixColumns operation or a composite redundant InvSubBytes and redundant InvMixColumns on the respective first redundant state using a lookup table (LUT) to produce a respective second redundant state; and
repeating the performing a specified number of times to produce output data representing one of a ciphertext or a plaintext from the respective second redundant state.

34. The computer program product as in claim 33, wherein the method further comprises:
performing a transformation on the respective redundant byte to produce the byte the respective redundant byte represents by using a LUT for the transformation.

35. The computer program product as in claim 34, wherein the LUT for the transformation is replaced with another LUT, the another LUT being created from a list of $2^d$ elements of a kernel of H.

36. The computer program product as in claim 33, further comprising:
verifying whether a matrix $$\begin{pmatrix} M_2 & M_3 & I & I \\ I & M_2 & M_3 & I \\ I & I & M_2 & M_3 \\ M_3 & I & I & M_2 \end{pmatrix},$$

where I is a unit matrix, $M_2$ is a matrix defined by redundant $Mul_2$ $(X)=M_2X+A_2$, and $M_3$ is a matrix defined by redundant $Mul_3$ $(X)=M_3X+A_3$ for $X \in U$, is invertible.

37. The computer program product as in claim 33, further comprising:
verifying whether a matrix $$\begin{pmatrix} M_e & M_b & M_d & M_9 \\ M_9 & M_e & M_b & M_d \\ M_d & M_9 & M_e & M_b \\ M_b & M_d & M_9 & M_e \end{pmatrix},$$

where $M_9$ is a matrix defined by redundant $Mul_9$ $(X)=M_9X+A_9$, $M_b$ is a matrix defined by redundant $Mul_b$ $(X)=M_bX+A_b$, $M_d$ is a matrix defined by redundant $Mul_d$ $(X)=M_dX+A_d$, and $M_e$ is a matrix defined by redundant $Mul_e$ $(X)=M_eX+A_e$ for $X \in U$, is invertible.

38. An electronic apparatus, the electronic apparatus comprising:
memory; and
processing circuitry coupled to the memory, the processing circuitry being configured to:
receive input data representing one of a plaintext or a ciphertext, and a key;
represent each byte B of the input data as a respective redundant byte B', the respective redundant byte having 8+d bits, d≥0, where the respective redundant byte is an element of a vector space U of dimension 8+d such that B=H(B') where H is a homomorphism H: U↦ V, where V is a vector space of dimension 8 in which each element is a byte such that one of redundant representations of the byte is a same value extended by d most significant zeroes;
perform:
an AddRoundKey operation and a ShiftRows operation to produce a respective first redundant state; and
one of a composite redundant SubBytes and redundant MixColumns operation or a composite redundant InvSubBytes and redundant InvMixColumns on the respective first redundant state using a lookup table (LUT) to produce a respective second redundant state; and
repeat the performing a specified number of times to produce output data representing one of a ciphertext or a plaintext from the respective second redundant state.

39. The electronic apparatus as in claim 38, wherein the processing circuitry is further configured to:
perform a transformation on the respective redundant byte to produce the byte the respective redundant byte represents by using a LUT for the transformation.

40. The electronic apparatus as in claim 39, wherein the LUT for the transformation is replaced with another LUT, the another LUT being created from a list of $2^d$ elements of a kernel of H.

41. The electronic apparatus as in claim 38, wherein the processing circuitry is further configured to:
verify whether a matrix $$\begin{pmatrix} M_2 & M_3 & I & I \\ I & M_2 & M_3 & I \\ I & I & M_2 & M_3 \\ M_3 & I & I & M_2 \end{pmatrix},$$

where I is a unit matrix, $M_2$ is a matrix defined by redundant $Mul_2$ $(X)=M_2X+A_2$, and $M_3$ is a matrix defined by redundant $Mul_3$ $(X)=M_3X+A_3$ for $X \in U$, is invertible.

42. The electronic apparatus as in claim 38, further comprising:
verifying whether a matrix $$\begin{pmatrix} M_e & M_b & M_d & M_9 \\ M_9 & M_e & M_b & M_d \\ M_d & M_9 & M_e & M_b \\ M_b & M_d & M_9 & M_e \end{pmatrix},$$

where $M_9$ is a matrix defined by redundant $Mul_9$ $(X)=M_9X+A_9$, $M_b$ is a matrix defined by redundant $Mul_b$ $(X)=M_bX+A_b$, $M_d$ is a matrix defined by redundant $Mul_d$ $(X)=M_dX+A_d$, and $M_e$ is a matrix defined by redundant $Mul_e$ $(X)=M_eX+A_e$ for $X \in U$, is invertible.

* * * * *